Sept. 10, 1963    R. W. URE, JR., ETAL    3,103,587
SELF-COOLED INFRARED DETECTION CELL
Filed Feb. 19, 1959
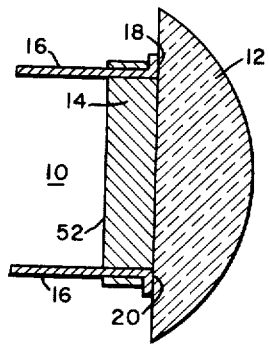
Fig. 1.
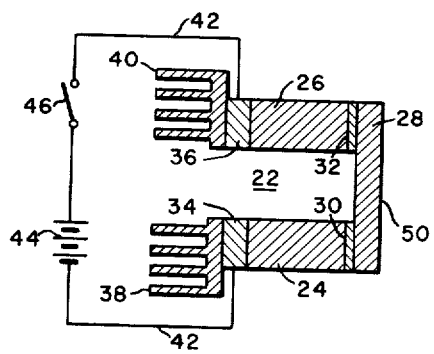
Fig. 2.
Fig. 3.
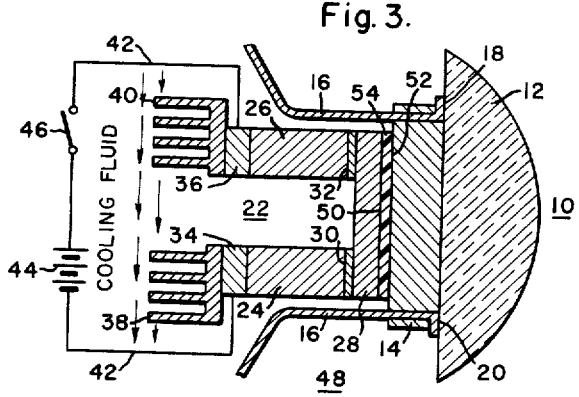
WITNESSES
Wm. B. Sellers
C. L. Menzemer
INVENTORS
Roland W. Ure, Jr. and
Edward V. Somers.
BY
Frederick Shopp
ATTORNEY

# United States Patent Office 3,103,587
Patented Sept. 10, 1963

3,103,587
SELF-COOLED INFRARED DETECTION CELL
Roland W. Ure, Jr., Monroeville, and Edward V. Somers, Pittsburgh, Pa., assignors to Westinghouse Electric Corporation, Pittsburgh, Pa., a corporation of Pennsylvania
Filed Feb. 19, 1959, Ser. No. 794,452
7 Claims. (Cl. 250—83.3)

This invention relates generally to self-cooled infrared detecting devices and more specifically to thermoelectric cooled devices.

Any object having a temperature above absolute zero (−273° C.), generates infrared radiation. The total quantity of infrared radiation generated by a body increases as the fourth power of the body's absolute temperature increases.

These phenomena have led to the development of various devices for detecting the presence or approach, the identification of an unknown object or a change in the temperature of a known object. For example, an infrared detector may be used to warn of approaching aircraft or to warn of a dangerous temperature rise in a gasoline storage tank.

Infrared radiation is generated by molecular thermal action within a body. The infrared radiation itself is not heat radiation, but heat is the end result produced in bodies that absorb infrared radiation, such as an infrared detector. As the temperature of a detector rises, due either to the absorption of more and more radiation or from the ambient the sensitivity of the device is decreased.

Various systems have been proposed to cool infrared devices such as, for example, enclosing the detector in a cooling vessel filled with a liquid possessing a low boiling point. However, these systems tend to be bulky and heavy, lack portability, are inconvenient to service, and to malfunction when the detector is subjected to outside forces such as shocks, bumping, knocking and so forth.

An object of the present invention is to provide a device for detecting infrared radiation comprising in co-operative combination an infrared detector and a thermoelectric refrigeration member to maintain the detector proper at a desired low temperature, the combination being free from the objections of previous systems.

Another object of the present invention is to provide a device for detecting infrared radiation comprising a solid state infrared detector and a thermoelectric cooling device having a cold junction in direct contact with the detector.

Other objects of the present invention will, in part, be obvious and will, in part, appear hereinafter.

For a better understanding of the nature and objects of the invention, reference should be had to the following detailed description and drawings in which:

FIG. 1 is a partial view in cross-section of one type of infrared detector suitable for use in accordance with this invention;

FIG. 2 is a partial view in cross-section of a thermoelectric device suitable for use in accordance with this invention;

FIG. 3 is a view in cross-section of a thermoelectrically cooled infrared detector incorporating the teaching of this invention.

In accordance generally with the present invention and attainment of the foregoing objects, there is provided a device comprising in co-operative combination an infrared energy detection means and a thermoelectric refrigeration device for maintaining the infrared means at a desired low temperature and high sensitivity.

For the purpose of clarity this invention will be described in terms of a solid state photoconductor infrared detector. However, it will be understood that the teachings of this invention are equally applicable to a thermal (bolometer) infrared detector.

More specifically and with reference to FIGS. 1 and 3, there is shown a solid state photoconductive type infrared detection device 10 comprised of an infrared dome or lens 12, an infrared sensitive semiconductor material 14, and electrical conductors 16. For the purpose of showing the details more clearly, FIG. 1 comprises only the infrared detector.

The dome or lens 12 serves to protect the material 14 from the elements and to focus the energy upon the material 14. The dome or lens 12 is comprised of a material that is highly transparent to infrared energy in that portion of the infrared spectrum in which the detector is to function. Examples of suitable materials for the lens include arsenic trisulphide, germanium, silicon, fused silica (quartz), and silver chloride. It will be understood that the detector may be used in some instances without a lens.

The semiconductive material 14 is disposed upon one surface of the lens 12 by vapor deposition or any of the other suitable means known in the art. The thickness of the material 14 may vary from $\frac{1}{32}$ to $\frac{1}{16}$ inch. Examples of suitable semiconductor materials include lead sulphide, lead telluride, lead selenide, indium antimonide and germanium doped with at least one impurity selected from the group consisting of gold, nickel and zinc.

In operation, the infrared energy passes through the lens 12, and the photon energy is absorbed by the material 14. The absorbed energy produces a change in the electrical resistance or conductivity of the material 14. The electrical effect of the change is transmitted to an evaluating device (not shown) through conductors 16.

The conductors 16, which may be comprised of a suitable electrically conductive material for example, copper, aluminum and so forth, pass through the edges of material 14 and are in good electrical contact therewith so as to enable detection of changes in electrical resistance thereof. In order to hold the conductors in place, the ends may be soldered to the lens 12 at points 18 and 20.

With reference to FIGS. 2 and 3 (FIG. 2 showing the thermoelectric cooler alone), there is illustrated a thermoelectric cooling device 22 comprised of a positive thermoelectric element member 24 and a negative thermoelectric element member 26. Examples of suitable p-type thermoelectric elements include $SbBiTe_3$ and $Bi_2Te_3$. Examples of suitable n-type thermoelectric elements include $Bi_2Te_{2.4}Se_{0.6}$, $Bi_2Te_2Se$ and $Bi_2Te_3$. The thermoelectric properties of both the p and n-type materials may be improved by doping with a suitable material for example, selenium, copper bromide, iodine, silver bromide and the like.

An electrically conducting strip of metal 28, for example, copper, silver or the like is joined to an end face 30 of member 24 and end face 32 of member 26 to provide good electrical and thermal contact therewith these forming the cold junction of the thermoelement. The end faces 30 and 32 may be coated with a thin layer of metal, for example, by vacuum evaporation electroplating or by use of ultrasonic brazing to provide a good electrical contact between members 24, 26 and 28. The metal strip 28 may be brazed or soldered to the metal coated faces 30 and 32. At the other end of members 24 and 26 metal plates or strips 34 and 36 respectively are joined to members 24 and 26 by brazing or soldering. The plates 34 and 36 may be provided with heat dissipating fins 38 and 40 respectively, whereby heat generated thereat is dissipated.

An electrical conductor 42 attached to a source of direct current 44 is affixed to the end plates 34 and 36. A switch 46 is interposed in the conductor 42 to enable the electric circuit to be opened and closed as desired. When the switch 46 is moved to a closed position, electrical current from the source 44 flows through the thermoelements 24 and 26 whereby cooling is affected in the metal strip 28 and heat is generated at the plates 34 and 36. Surface 50 on member 28 is a cold junction surface.

With reference to FIG. 3, there is illustrated one embodiment of a complete device 48 illustrating the teachings of this invention. The device 48 is comprised of the infrared detector 10 of FIG. 1 and the thermoelectric device 22 of FIG. 2 joined togethter in co-operative combination.

In joining device 22 to device 10 a thin layer 54 of a thickness of $\frac{1}{32}$ to $\frac{1}{8}$ inch, of a material capable of electrically insulating device 10 from device 22 is disposed between the surface 52 of the semiconductor material 14 and the cold junction surface 50 of device 22, and the surfaces are held in direct thermal contact with layer 54 by mechanical means not shown. This enables good cooling of the sensitive material 14. The cooling ability of device 22 may be further increased by thermally insulating the cold junction 50 from the cooling fins 38 and 50 with a body of any suitable insulating material as, for example, glass wool.

In addition to being an electrical insulator, material for layer 54 must be a relatively good thermal conductor so that cold surface 50 will cool the semiconductor material 14 with a low thermal gradient. Examples of suitable materials for layer 54 include petroleum jelly, silicone grease, a thermoplastic resin such as polyethylene or a thermoset resin such as epoxy resins, the material of layer 54 may contain heat conducting fillers such as silica, alumina and the like.

With reference to the operation of the device of FIG. 3, infrared radiation passes through the lens 12 and contacts the semiconductor material 14. The material 14 absorbs photon energy from the infrared energy which produces a change in the electrical resistance or conductivity of the material 14. Such a change is relayed through leads 16 to meters or other evaluating apparatus (not shown) which is capable of identifying the source of radiation or indicating a temperature change in a known source. The switch 46 is closed causing electric current to flow through the conductor 42, thermoelectric member 24, metal strip 28, and thermoelectric member 26, whereby member 28, being part of the cold junction, is cooled and it, in turn, cools material 14.

The thermoelectric device 22 is so constructed and associated to cool the infrared sensitive material 14 to a temperature below room temperature, for example, 20° C. below room temperature, thereby improving the sensitivity and spectral response of the device.

For certain applications, infrared devices are cooled by liquid nitrogen to temperatures as low as 77° K. The combining of the thermoelectric refrigeration device of this invention in intimate co-operative relationship with the infrared element of such detectors, as taught herein, makes it possible to cool such devices an additional 10° K. to 20° K., i.e. to 67° K. to 57° K.

The following example is illustrative of the practice of this invention.

*Example 1*

A device of the type illustrated in FIG. 3 was prepared.

The p-type member of the thermoelectric device was comprised of $Bi_2Te_3$ and the n-type member of $Bi_2Te_{2.4}Se_{0.6}$. Contact was established between the p- and n-type members with an aluminum strip. Aluminum cooling fins were disposed upon the hot junction of the thermoelectric device. The entire thermoelectric member was $1\frac{3}{16}$ inches high and $1\frac{1}{4}$ inches in diameter.

In an ambient of 75° F., the thermoelectric device achieved a minimum no load, cold junction temperature of 41° F. and a hot junction temperature of 104° F. with a current input of 6 amperes. Still lower cold junction temperatures can be produced with more current.

The lens of the infrared detector was comprised of arsenic trisulphide and the semiconductor material was lead sulphide. The area of mutual contact between the cold junction of the thermoelectric refrigerator and the detector was approximately that of a $\frac{1}{2}$ inch x $\frac{1}{4}$ inch rectangle.

The thermoelectric refrigeration unit and the infrared device were joined as shown in FIG. 3 with a layer of about $\frac{1}{32}$ inch thickness of a silicone grease.

The detector was allowed to absorb infrared radiation having a frequency of three microns without being cooled by operation of the thermoelectric component, and its operating characteristics recorded.

The procedure was then repeated and a current of 6 amps. passed through the thermoelectric device. The resultant cooling was sufficient to decrease the noise output of the detector by a factor of approximately 8 and to increase the sensitivity of the cell by a factor of about 1.8 thus giving a 1400% increase in the signal to noise ratio.

Another device similar to that of Example I is produced by substituting an infrared detector cell comprising germanium doped with gold.

While this invention has been described in terms of one thermoelectric element cooling a small infrared detector, it will be understood that several thermoelectric elements, connected thermally in parallel or in series, may be employed to cool a large infrared detector or to produce even greater thermal drops.

In such an arrangement, the cold junction of each element may be in contact with a common metal plate, comprised of for example aluminum or copper, which is in thermal contact with the infrared sensitive material. The metal plate provides for an even cooling over the entire surface of the sensitive material. The plate is electrically insulated from the sensitive material by a suitable material such as that which comprises layer 54 of FIG. 3.

While the invention has been described with reference to particular embodiments thereof, it will be understood that modifications, substitutions and the like may be made therein without departing from its scope.

We claim as our invention:

1. An infrared detector comprising in cooperative relationship a body of an infrared sensitive solid state material and a cold junction of a thermoelectric refrigeration device electrically insulated from and in direct thermal contact with said body of sensitive material.

2. An infrared detector comprising in cooperative relationship a body of an infrared sensitive solid state material and a cold junction of a thermoelectric refrigeration device electrically insulated from and in direct thermal contact with said body of sensitive material, said sensitive material being comprised of germanium doped with at least one impurity selected from the group consisting of gold, nickel and zinc.

3. The detector of claim 1 in which the body of infrared sensitive solid state material is comprised of lead sulphide.

4. An infrared detector comprising in cooperative relationship a lens, a body of an infrared sensitive solid state material, said body of infrared sensitive solid state material being in direct contact with said lens, and a cold junction of a thermoelectric refrigeration device electrically insulated from and in direct thermal contact with said body of sensitive material.

5. The device of claim 4 in which the body of infrared sensitive solid state material is comprised of germanium doped with at least one impurity selected from the group consisting of gold, nickel and zinc.

6. The device of claim 4 in which the body of infrared sensitive solid state material is comprised of lead sulphide.

7. An infrared detector comprising in cooperative relationship a body of an infrared sensitive solid state material, a cold junction of a thermoelectric refrigeration device electrically insulated from and in direct thermal contact with said body of sensitive material, and a body of a cooling fluid in contact with a hot junction of said thermoelectric refrigeration device.

References Cited in the file of this patent

UNITED STATES PATENTS

| | | |
|---|---|---|
| 2,189,122 | Andrews | Feb. 6, 1940 |
| 2,727,119 | Thomson | Dec. 13, 1955 |
| 2,777,975 | Aigrain | Jan. 15, 1957 |
| 2,872,788 | Lindenblad | Feb. 10, 1959 |
| 2,921,973 | Heikes et al. | Jan. 19, 1960 |
| 2,953,529 | Schultz | Sept. 30, 1960 |
| 2,964,636 | Cary | Dec. 13, 1960 |

OTHER REFERENCES

A Semi-Conducting Antimony Bolometer, by Gillham, published in Journal of Scientific Instruments, vol. 33, September 1956, pages 338–341.

Scientific American, vol. 199, No. 3, September 1958, page 113.

Thermoelectric Refrigerator, by Heinicke, published in Refrigerating Engineering, February 1959, page 34.